LIGHT RESPONSIVE CONTROL SYSTEM

Filed Nov. 23, 1956 2 Sheets-Sheet 1

INVENTOR.
Charles W. Miller &
George W. Onksen
BY E. W. Christen
ATTORNEY.

April 26, 1960 C. W. MILLER ET AL 2,934,676

LIGHT RESPONSIVE CONTROL SYSTEM

Filed Nov. 23, 1956 2 Sheets-Sheet 2

INVENTOR.
Charles W. Miller &
George W. Onksen
BY
E. W. Christen
ATTORNEY.

2,934,676

United States Patent Office

Patented Apr. 26, 1960

2,934,676

LIGHT RESPONSIVE CONTROL SYSTEM

Charles W. Miller and George W. Onksen, Anderson, Ind., assignors to General Motors Corporation, Detroit, Mich., a corporation of Delaware Application November 23, 1956, Serial No. 624,111

11 Claims. (Cl. 313—83)

This invention relates to light responsive control systems and more particularly to an improved pick-up device and signal voltage developing circuit for such systems.

In automatic headlamp control systems and the like, it is desirable that the system be relatively non-responsive to ambient or background illumination and to discriminate between a point source type of illumination and background illumination. Such discrimination will ensure system response to the headlamps of an on-coming vehicle and will prevent response to high level, distributed ambient illumination such as that provided by street lighting.

In accordance with this invention, a discriminating system is provided which effectively scans a field of illumination sources and responds only to the occurrence of illumination from a point type source. This is accomplished by utilizing a plurality of light responsive elements disposed in an array corresponding to the field to be scanned. Suitably, optical means are provided to control the light distribution and to define the field which illuminates the elements. The light responsive elements are connected in individual sensing circuits which are adapted to develop a signal voltage corresponding to the value of illumination of the respective element. When all the elements are illuminated equally the signal voltages are equal but when one or more elements are subjected to a higher value of illumination as by a point source in the field, the signal voltages differ accordingly. To detect this condition, a commutator is utilized for sequentially applying the signal voltages to a voltage change responsive circuit which develops a control voltage upon the occurrence of a difference in the value of the signal voltages. The control voltage is applied to a utilization device such as a control relay for effecting the desired control action such as the dimming of the vehicle headlamps.

A more complete understanding of this invention may be had from the detailed description which follows taken with the accompanying drawings in which.

Figure 1:
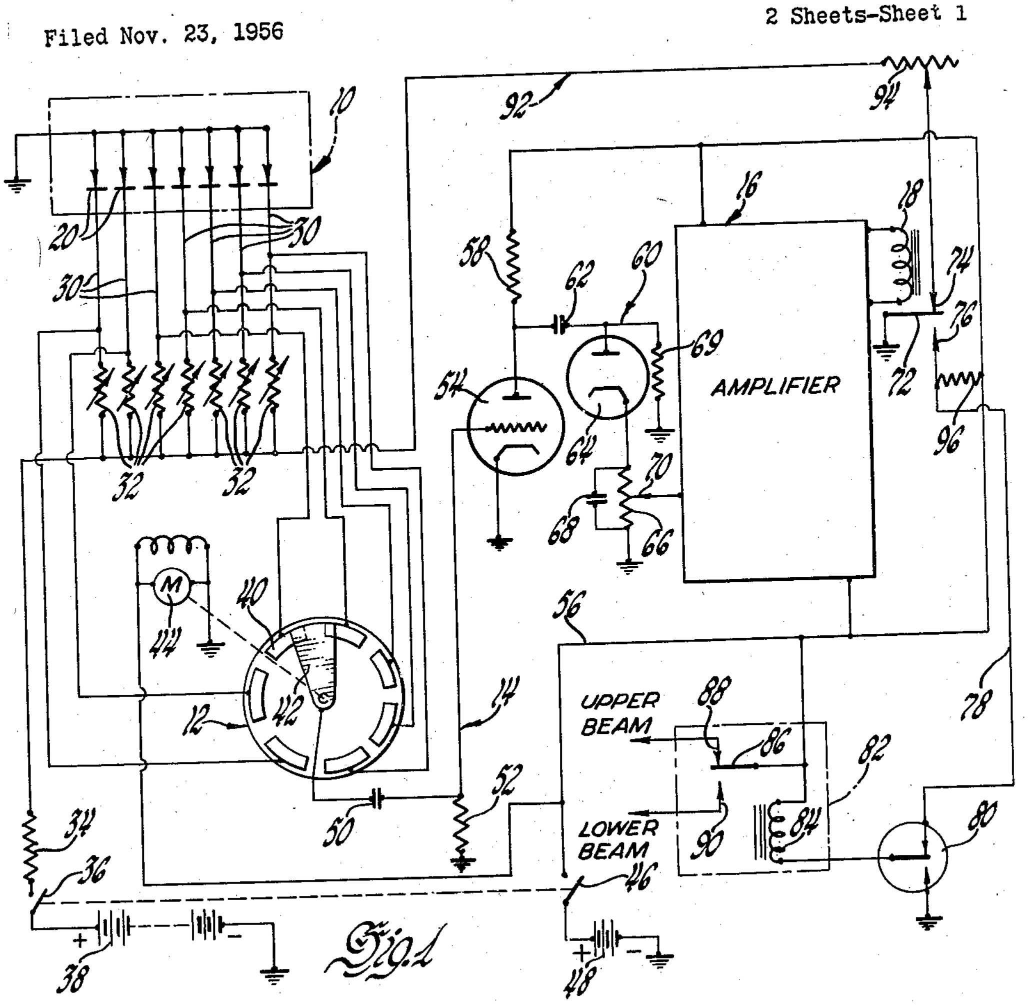
Figure 1 is a schematic diagram of one embodiment of the inventive system.

Referring now to the drawings there is shown in Figure 1 an illustrative embodiment of the invention in an automatic headlamp control system. In general, it comprises a pick-up unit 10 and associated circuits for developing signal voltages which are sequentially applied through a commutator 12 to a voltage change responsive circuit 14. The voltage change responsive circuit develops a control voltage which is applied through a rectifier circuit 60 to the amplifier 16 to control the energization of a control relay 18 of a headlamp control circuit.

Figure 2:
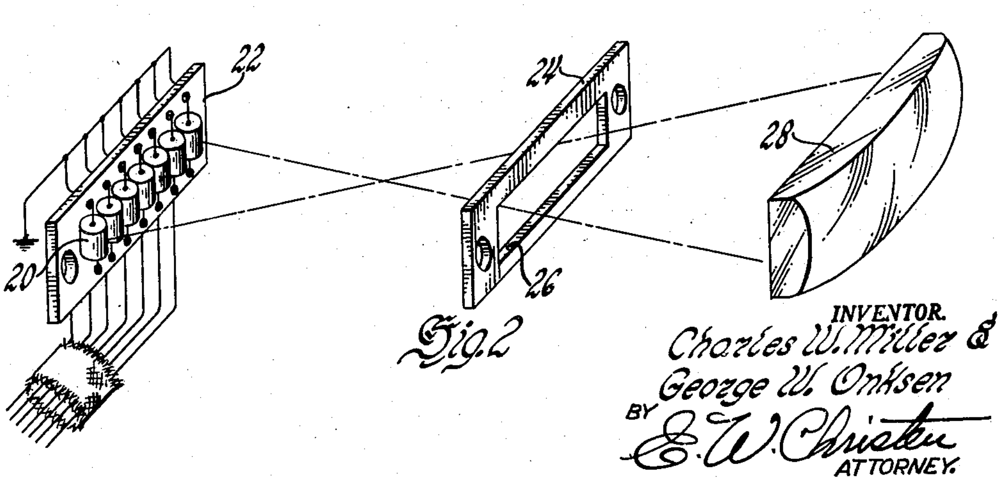
Figure 2 is a diagrammatic representation of the pick-up device.

The pick-up device 10 is shown diagrammatically in Figure 2 and comprises a plurality of light responsive or photoconductive elements 20 which are disposed in a predetermined array upon a mounting plate 22. An opaque mask 24 defining a window 26 is disposed adjacent the photoconductive elements 20. A suitable lens 28 is positioned over the mask 24 for controlling the transmission of light rays from the field to be scanned to the photoconductive elements. Preferably, the mask 24 is disposed at the focal point of the lens 28 and the window 26 is effective to determine the angle of pick-up or the extent of the field to be scanned. The array of photoconductive elements 20 is of a configuration corresponding to that of the field to be scanned and in the illustrative embodiment of Figures 1 and 2, the photoconductive elements are crystal type photodiodes.

A sensing or signal voltage developing circuit 30 corresponding to each of the photoconductive elements 20 extends from a point of common reference potential or ground through the element 20 from cathode to anode and thence through an adjustable resistor 32, a voltage dropping resistor 34, and a switch 36, to the positive terminal of a direct voltage source or battery 38 which has its negative terminal connected to ground. The signal voltage developed across the individual photoconductive elements 20 is, of course, a function of the illumination and the value of the resistor 32. Preferably, the resistors 32 are adjusted in value so that the voltage drop across the elements 20 is the same for all elements when they are subjected to equal values of illumination.

A comparison of the values of the plural signal voltages is obtained by sequential connection thereof through the commutator 12 to the voltage change responsive circuit 14. The commutator 12 is of the type adapted to sequentially connect a plurality of individual terminals to a common terminal thereof and suitably takes the form of a rotary commutator having a plurality of stator or fixed contacts 40 and a single rotor contact 42. The rotor contact 42 is of the bridging type and is dimensionally proportioned to engage adjacent fixed contacts simultaneously. The rotor contact 42 is rotatably driven by a direct current motor 44 having one terminal connected to ground and the other terminal connected through the headlamp switch 46 to the positive terminal of the vehicle battery 48 which has its negative terminal connected to ground.

In order to detect the occurrence of a difference between the values of the signal voltages, the voltage change responsive circuit 14 is provided. This circuit is sequentially connected across the photoconductive elements 20 by the commutator 12 and comprises a condenser 50 and a series resistor 52 connected between the rotor contact 42 and ground. Thus, the voltage change responsive circuit suitably takes the form of a conventional differentiating circuit and is effective to develop a voltage pulse across the resistor 52 when the applied voltage changes. A control voltage, derived across the resistor 52, is applied to the input circuit of an amplifier tube 54. The amplifier tube 54 is suitably of the low voltage triode type and has an output circuit extending from the battery 48 through the headlamp switch 46, conductor 56, plate circuit resistor 58 to the plate electrode and thence from the cathode through ground to the negative terminal of the battery. The amplified control voltage from amplifier tube 54 is taken from the plate electrode.

In order to cause system response only to a control voltage of a given polarity a rectifier circuit 60 is provided. The rectifier circuit is coupled to the plate electrode of tube 54 by a condenser 62 and comprises a diode 64 having its plate connecting to the condenser 62 and its cathode connected through a potentiometer resistor 66 to ground. A smoothing condenser 68 is connected in parallel with the resistor 66 and a resistor 69 is connected in parallel with the diode 64. The output control voltage from the rectifier circuit 60 is derived from the output terminal or movable contact 70 of the potentiometer resistor 66 and is adjustable in amplitude by positioning of the movable contact. This output voltage is applied to the input terminals of the amplifier 16.

The amplifier 16 may be of conventional design and adapted to respond to a predetermined value of input voltage to cause actuation of the control relay 18. Preferably, the amplifier 16 is of the multivibrator type disclosed and claimed in the copending United States patent application Serial No. 557,582, filed January 5, 1956, now Patent No. 2,832,914, by Eugene G. Matkins and Charles W. Miller for "Condition Responsive Control Circuit" and assigned to the assignee of the present invention. The amplifier 16 has an output circuit which includes the energizing winding of the control relay 18 and which is maintained normally conductive in the absence of an input control voltage. A positive input control voltage, in the illustrative embodiment, is effective to terminate output circuit conduction to actuate control relay 18. The control relay 18 is provided with a movable contact 72 connected to ground and adapted to engage, when the relay is energized, a first fixed contact 74 and to engage, when the relay is de-energized, a second fixed contact 76.

The control relay 18 is effective to control the automatic selection of the upper and lower beam headlamp circuits. For this purpose a power relay 82 is provided in a circuit which extends from ground to the movable contact 72 to fixed contact 76, through conductor 78, the conventional foot operated dimmer switch 80, through the energizing coil 84 of the power relay and conductor 56 to the headlamp switch 46 and thence through the battery 48 to ground. The power relay 82 includes a movable contact 86 which is normally in engagement with the upper beam fixed contact 88 and which is adapted for engagement, when the power relay is energized, with the lower beam fixed contact 90.

The control relay 18 is also adapted to control the sensitivity of the system. A sensitivity control circuit 92 extends from ground to the movable contact 72 and fixed contact 74 and thence through a variable voltage divider resistor 94 to the common junction of the variable resistors 32. The sensitivity control circuit, just described usually referred to as the dim control, establishes a parallel connection of the voltage divider resistor 94 with the resistors 32 and photoconductive elements 20. A resistor 96 is suitably connected in parallel with the energizing winding 84 of power relay 82 to afford protection for the contacts of relay 18.

In operation, the inventive system is energized by closing the headlamp switch 46 and the associated switch 36. This is effective to energize the amplifiers 16 and 54 and the motor 44 from the battery 48 and to energize the sensing circuits 30 from the battery 38. Accordingly, each of the photoconductive elements 20 develops a signal voltage in the respective sensing circuit corresponding to the illumination and the signal voltages are applied to the fixed contacts 40 of the commutator 12. By rotation of the rotor contact 42 the signal voltages are sequentially applied to the voltage change responsive circuit 14. As an initial adjustment the resistors 32 are adjusted so that all signal voltages are equal when all photoconductive elements are subjected to the same illumination. Therefore, assuming that the field to be scanned is of uniform intensity throughout, all signal voltages are equal and the input voltage to the voltage change responsive circuit remains constant. Accordingly, the voltage across the resistor 52 remains constant at the value of grid bias voltage developed by tube 54. Thus, there is no input signal voltage to the amplifier tube 54 and the control voltage appearing at movable contact 70 and applied to the amplifier 16 is zero. The output circuit of the amplifier 16 remains in its normally conductive condition and the control relay 18 remains energized with the contacts in the position shown. The power relay 82 remains de-energized and the contacts thereof remain in the position shown to energize the upper beam circuit of the headlamps.

When a point source of illumination, such as the lights of an oncoming vehicle, appears in the field being scanned the particular photoconductive element 20 which is illuminated thereby will suffer a change in resistance and the voltage thereacross will decrease. This voltage change will be applied to the circuit 14 by the commutator 12 when the rotor contact engages the fixed contact which corresponds to the particular photoconductive element. Thus, a negative going voltage will appear across the resistor 52 and will be amplified by the tube 54 and, with the phase inversion thereof, will be applied as a positive voltage across the rectifier circuit 60. The positive voltage will cause conduction through diode 64 and potentiometer resistor 66. The positive voltage pulse will be smoothed or averaged by the condenser 68 and applied through movable contact 70 to the input terminals of the amplifier 16. It will be noted that any positive going voltage applied by the commutator 12 to the voltage change responsive circuit 14 and amplified in tube 54 will be blocked by the diode 64 and thus will not appear as a control voltage at amplifier 16. A control voltage applied to the amplifier 16 causes the output circuit thereof to change its conductive condition and thus the relay 18 is de-energized. Consequently, the movable contact 72 engages the fixed contact 76 and the energizing circuit for the power relay 82 is completed. This causes the movable contact 86 of the power relay to engage the lower beam fixed contact 90 and complete the lower beam energizing circuit.

Actuation of the control relay 18 also causes interruption of the movable contact 72 and fixed contact 74 which interrupts the sensitivity control circuit 92. Accordingly, the voltage applied across the resistors 32 and photoconductive elements 20 by the battery 38 is increased and the sensitivity of the system is likewise increased requiring a lesser value of illumination to produce a signal voltage which will maintain the control relay 18 de-energized.

Figure 3:
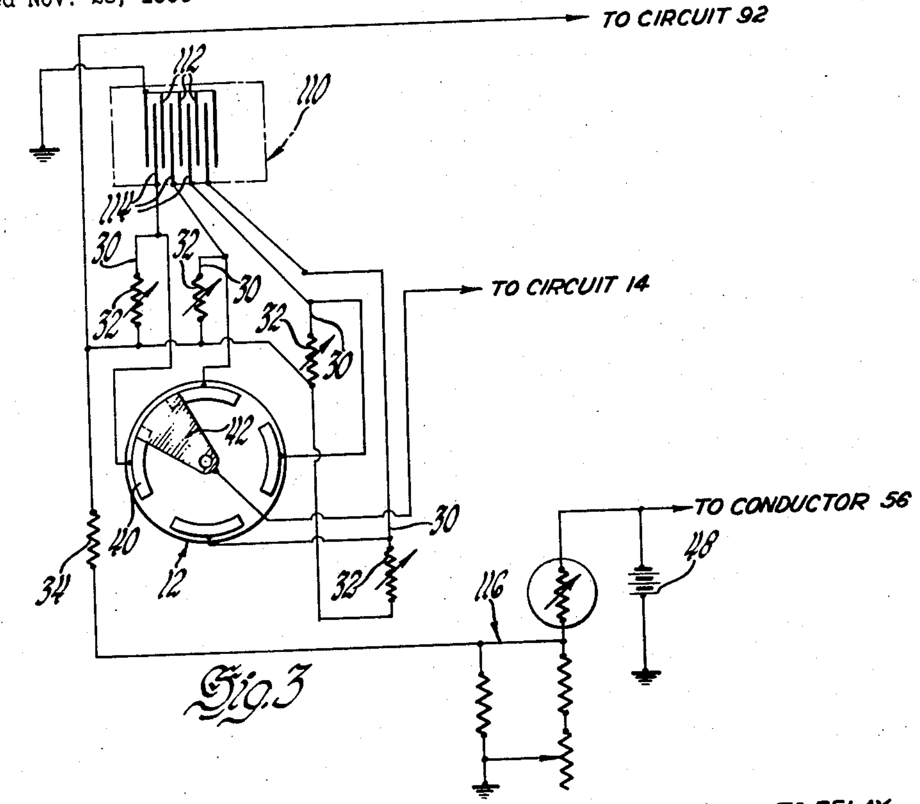
Figure 3 is a schematic diagram of a modification of the inventive system.

In Figure 3 there is shown a modification of the pick-up device which may be utilized in the system just described. The pick-up device 110 is of the broad area photoconductive cell type and comprises a plurality of interdigitated conductive elements 112 and 114. The alternately disposed conductive elements 112 are connected together at a common terminal which is connected to ground. Each of the conductive elements 114 is connected in individual signal developing circuits 30 through a variable resistor 32 to a respective fixed contact 40 on the commutator 12. The pick-up device 110 is suitably an RCA broad area photoconductive cell type C–7203 modified to provide individual terminals for the alternate conductive elements.

The signal voltage developing circuits 30 are energized from the battery 48 through the voltage regulator 116 and the voltage divider resistor 34. The output signal voltage is derived from the rotor contact 42 of the commutator 12 and applied to the voltage change responsive circuit 14. The operation of this modification is the same as that described with respect to Figure 1.

Figure 4:
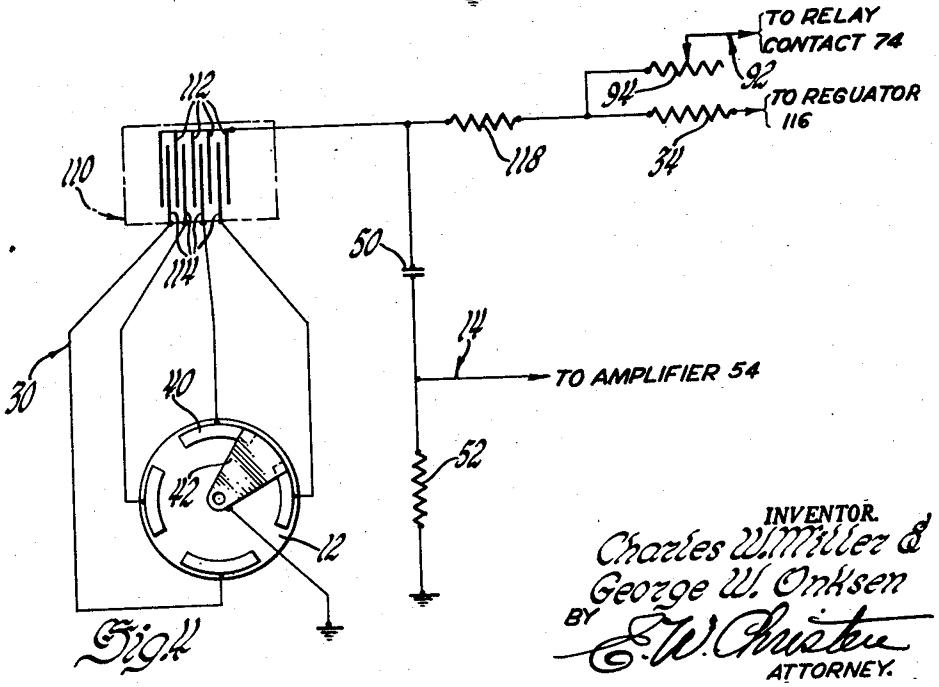
Figure 4 is a schematic diagram of an additional modification of the inventive system.

In the embodiment of the invention illustrated in Figure 4, a modification of the signal voltage developing circuit is employed. In this embodiment the signal voltage is taken directly across the pick-up device 110, the individual elements of which are sequentially energized by operation of thle commutator 12. The pick-up device 110 is energized by the circuit extending from the voltage source and regulator through the voltage divider resistor 34 and load resistor 118 to the common elements 112. The individual elements 114 are connected sequentially to ground through the commutator 12. Thus the signal voltages are applied sequentially to the voltage change responsive circuit 14 including condenser 50 and resistor 52. The control voltage is derived across the resistor 52 and applied to the amplifier 54 as described with reference to Figure 1. The sensitivity control circuit 92 extends through the voltage divider resistor 94 to the junction of resistors 118 and 34. Thus, when the control relay contacts are operated to complete the sensitivity control circuit 92, that portion of the supply voltage appearing across resistor 94 is applied across the load resistor 118 and the pick-up device 110. When the sensitivity control circuit 92 is interrupted, the entire supply voltage is applied across resistors 34, 118 and the pick-up device 110. Otherwise, the operation of the embodiment illustrated in Figure 4 is the same as that described with respect to Figure 1.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

What is claimed is:

1. A control system adapted to respond to a point source of illumination in a field to be scanned comprising, a plurality of sensing circuits each including a light responsive element and adapted to develop a signal voltage corresponding in value to the illumination of said element, the elements being disposed in a predetermined array corresponding to the field to be scanned, optical means producing an image of said field upon said array, a voltage change responsive circuit adapted to develop a control voltage in response to change of input voltage, commutator means interposed between the sensing circuits and the voltage change responsive circuit for sequentially applying the individual signal voltages to the voltage change responsive circuit, and a utilization device connected to the voltage change responsive circuit and adapted to respond to said control voltage.

2. A control system adapted to respond to a point source of illumination in a field to be scanned comprising, a plurality of sensing circuits each including a light responsive element and adapted to develop a signal voltage corresponding in value to the illumination of said element, the elements being disposed in a predetermined array corresponding to the field to be scanned, optical means producing an image of said field upon said array, commutator means having a different pair of input terminals connected to the output terminals of each of said sensing circuits, a differentiating circuit connected to the commutator output terminals and adapted to develop a control voltage in response to a change of input voltage, and a utilization device responsive to said control voltage and connected to the output terminals of the differentiating circuit.

3. A control system adapted to respond to a point source of illumination in a field to be scanned comprising, a plurality of sensing circuits each including a light responsive element and adapted to develop a signal voltage corresponding in value to the illumination of said element, the elements being disposed in a predetermined array corresponding to the field to be scanned, optical means producing an image of said field upon said array, a rotary commutator having a different fixed contact connected to the output terminal of each sensing circuit and having a movable contact adapted for sequential engagement with the fixed contacts, a differentiator connected to the movable contact for developing a control voltage, and a utilization device connected across the output terminals of the differentiator.

4. A control system adapted to respond to a point source of illumination in a field to be scanned comprising, a plurality of light responsive elements disposed in an array corresponding to the field to be scanned, lens means disposed between the elements and said field and producing an image of said field upon said array, a mask defining a window and interposed between the lens means and the elements, a plurality of sensing circuits each including a different one of said elements and adapted to develop a signal voltage corresponding in value to the illumination of said element, a voltage change responsive circuit adapted to develop a control voltage in response to a change of input voltage, commutator means interposed between the sensing circuits and the voltage change responsive circuit for sequentially applying the individual signal voltages to the voltage change responsive circuit, and a utilization device responsive to the control voltage and connected to the voltage change responsive circuit.

5. A control system adapted to respond to a point source of illumination in a field to be scanned comprising a plurality of sensing circuits each including a light responsive element and adapted to develop a signal voltage corresponding in value to the illumination of said element, said elements being disposed in a predetermined array corresponding to the field to be scanned, optical means producing an image of said field upon said array, commutator means having a different pair of input terminals connected to the output terminals of each of said sensing circuits, a differentiating circuit connected to the commutator means ouput terminals, a rectifier connected to the differentiating circuit output terminals, and a utilization device connected to the rectifier output terminals.

6. A control system adapted to respond to a point source of illumination in a field to be scanned comprising a plurality of sensing circuits each including a light responsive element and adapted to develop a signal voltage corresponding in value to the illumination of said element, said elements being disposed in a predetermined array corresponding to the field to be scanned, optical means producing an image of said field upon said array, commutator means having a different pair of input terminals connected to the output terminals of each of said sensing circuits, a condenser and resistor serially connected between the output terminals of the commutator means, a rectifier connected across said resistor, and a utilization device connected to the rectifier output terminals.

7. A control system adapted to respond to a point source of illumination in a field to be scanned comprising a plurality of sensing circuits each including a light responsive element and adapted to develop a signal voltage corresponding in value to the illumination of said element, said elements being disposed in a predetermined array coresponding to the field to be scanned, optical means producing an image of said field upon said array, a rotary commutator having a different fixed contact connected to the output terminal of each sensing circuit and having a movable contact bridging adjacent pairs of said fixed contacts, means for rotatably driving said movable contact, a differentiator connected to the movable contact for developing a control voltage, an amplifier connected to the output terminals of the differentiator, and a control relay in the output circuit of the amplifier.

8. A control system adapted to respond to a point source of illumination in a field to be scanned comprising a plurality of sensing circuits each including in series connection a source of voltage, a photoconductive element and an adjustable resistor, the photoconductive elements being disposed in a predetermined array corresponding to the field to be scanned, optical means producing an image of said field upon said array, said resistors being adjusted individually to develop equal signal voltages when the photoconductive elements are exposed to equal values of illumination, commutator means having a different pair of input terminals connected across each of said resistors, and a differentiating circuit connected between the output terminals of the commutator means, and a utilization device connected to the output terminals of the differentiating circuit.

9. A control system adapted to respond to a point source of illumination in a field to be scanned comprising commutator means having plural individual terminals sequentially connected to a common terminal, plural photoconductive elements each having a terminal connected with a different one of said individual terminals and having common terminals connected together, the photoconductive elements being disposed in a predetermined array corresponding to the field to be scanned, optical means producing an image of said field upon said array, a voltage source and a resistor serially connected between the commutator common terminal and the common terminals of the photoconductive elements, a differentiating circuit connected across said elements, and a utilization device connected to the output terminals of said differentiating circuit.

10. A vehicle headlamp control system adapted to respond to a point source of illumination of predetermined value to switch vehicle headlamps and comprising a plurality of sensing circuits each including a photo-conductive element, a voltage dropping resistor, and a voltage source, and adapted to develop a signal voltage corresponding in value to the illumination of said element and the voltage impressed thereacross, the photoconductive elements being disposed in a predetermined array corresponding to the field to be scanned, optical means producing an image of said field upon said array, a voltage change responsive circuit adapted to develop a control voltage, commutator means interposed between the sensing circuits and the voltage change responsive circuit for sequentially applying the individual signal voltages to the voltage change responsive circuit, a rectifier connected across the voltage change responsive circuit, an amplifier connected to the rectifier and having a control relay in its output circuit, said control relay having a movable contact and first and second fixed contacts, a dim sensitivity control circuit connected in parallel with said elements and including a voltage divider resistor and the movable and first fixed contacts of said relay, said movable contact being closed against the first fixed contact when the illumination of any element is less than the predetermined value, and a headlamp switching circuit connected across the movable contact and the second fixed contact, whereby relay actuation causes headlamp switching and changes the sensitivity of the system when the illumination of any element is greater than the predetermined value.

11. A vehicle headlamp control system adapted to respond to a point source of illumination of predetermined value to switch vehicle headlamps from bright to dim comprising a plurality of sensing circuits each including a photoconductive element, a voltage dropping resistor, and a voltage source, and adapted to develop a signal voltage corresponding in value to the illumination of said element and the voltage impressed thereacross, the photoconductive elements being disposed in a predetermined array corresponding to the field to be scanned, optical means producing an image of said field upon said array, a voltage change responsive circuit adapted to develop a control voltage, commutator means interposed between the sensing circuits and the voltage change responsive circuit for sequentially applying the individual signal voltages to the voltage change responsive circuit, a rectifier and a potentiometer resistor serially connected across the voltage change responsive circuit, a condenser in parallel with the potentiometer resistor, an amplifier connected across the output terminals of the potentiometer resistor and having a control relay in its output circuit, said potentiometer being adjusted to cause actuation of said relay at a predetermined value of illumination of any of said elements, said control relay having a movable contact and first and second fixed contacts, a dim sensitivity control circuit connected in parallel with said elements and including a voltage divider resistor and the movable and first fixed contacts of said relay, said movable contact being closed against the first fixed contact when the illumination of any element is less than the predetermined value, and a headlamp switching circuit connected across the movable contact and the second fixed contact to cause the headlamps to switch from bright to dim and to change the sensitivity of the system when the illumination of any element is greater than the predetermined value.

References Cited in the file of this patent

UNITED STATES PATENTS

| | | |
|---|---|---|
| 2,021,010 | Jenkins | Nov. 12, 1935 |
| 2,049,763 | De Forest | Aug. 4, 1936 |
| 2,632,040 | Rabinow | Mar. 17, 1953 |
| 2,734,149 | Rabinow | Feb. 7, 1956 |
| 2,754,452 | Onksen et al. | July 10, 1956 |
| 2,848,651 | Byrne | Aug. 19, 1958 |